Nov. 27, 1923

M. G. SOTNIKOV

COOKING UTENSIL

Filed July 20, 1922

1,475,606

INVENTOR
Matvei G. Sotnikov.
BY William J. Jackson
ATTORNEY.

Patented Nov. 27, 1923.

1,475,606

UNITED STATES PATENT OFFICE.

MATVEI G. SOTNIKOV, OF PHILADELPHIA, PENNSYLVANIA.

COOKING UTENSIL.

Application filed July 20, 1922. Serial No. 576,204.

*To all whom it may concern:*

Be it known that I, MATVEI G. SOTNIKOV, a citizen of the United States, residing at the city of Philadelphia, county of Philadelphia, and State of Pennsylvania, have invented a certain new and useful Improved Cooking Utensil, of which the following is a specification.

This invention relates to that class of cooking utensils designed for bringing fluids, as milk, to a temperature approximating boiling without danger of such fluid overflowing the utensil walls.

The leading object of the present invention is to provide a device designed for this purpose which is so arranged, connected and constructed that it is adjustable to fit within boiling receptacles of varied size both as to diameter and height. A further object is to provide means to prevent the vertical or upward movement of the device when liquid has reached the boiling point. Other and further objects reside in the provision of general details of construction and arrangement and combination of parts for attaining the results sought by the foregoing objects. Still other objects not at this time more particularly pointed out will appear hereinafter.

The invention consists of the improvements hereinafter described and finally claimed.

Figure 2:
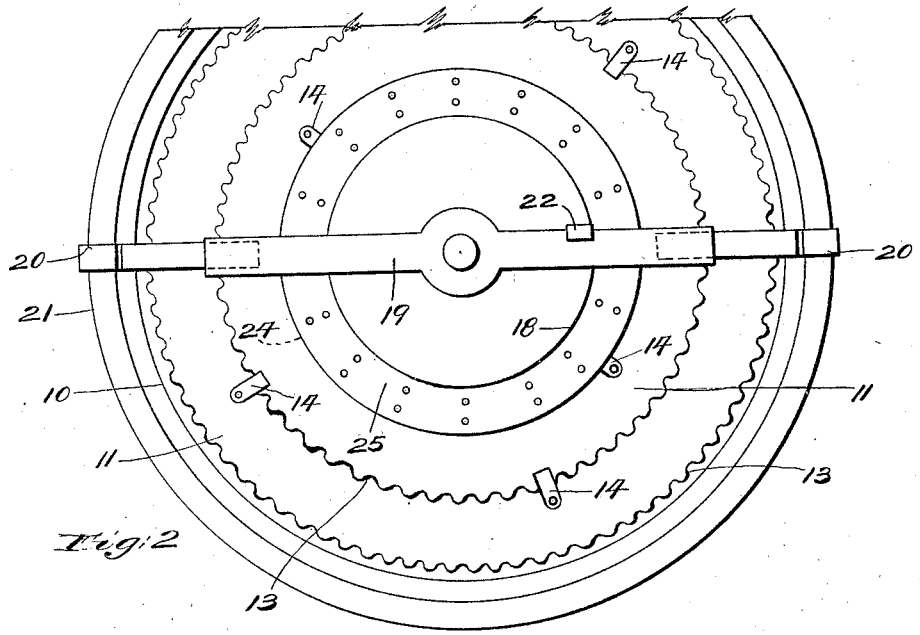
Figure 1:
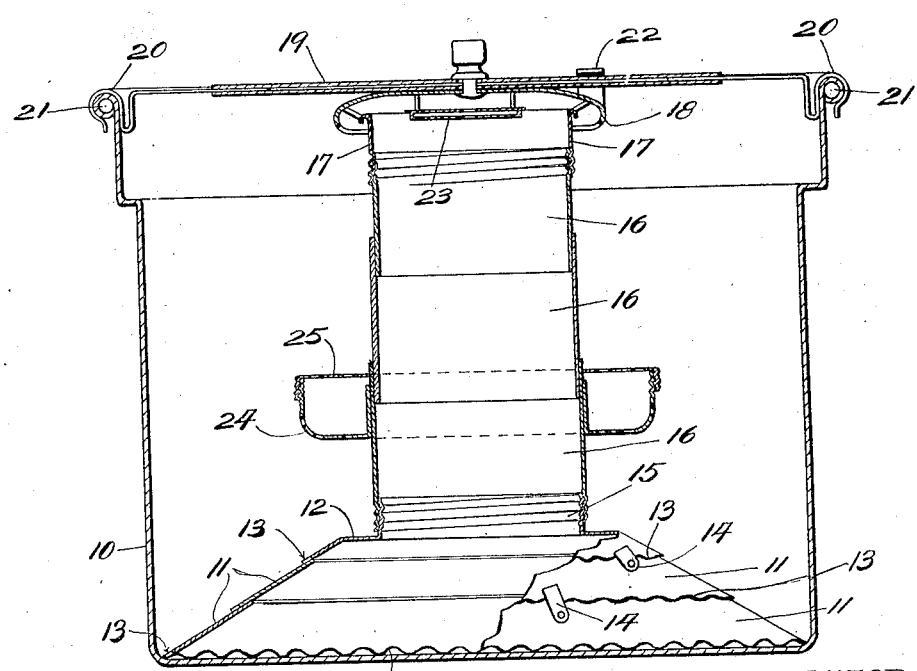

The nature, characteristic features and scope of the invention will be more fully understood from the following description taken in connection with the accompanying drawings forming part hereof, and in which:

Fig. 1, is a view partly in elevation and partly in section of a cooking utensil provided with a device embodying features of the invention, and Fig. 2, is a fragmentary view thereof in plan.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings 10 designates a cooking receptacle the size of which is immaterial since the device about to be described is adjustable to varied sizes of boilers, kettles and the like as used in a kitchen. Removably positioned within the receptacle is the device embodying features of the invention. Generally stated the device comprises an adjustable base-part, an adjustable funnel-like body-part and an adjustable cap-part. The base-part, which seats upon the receptacle bottom, is made up of a plurality of detachable, ring-like members 11 of which the number is immaterial. These members 11 are of graded sizes, the member of smallest diameter being detachably secured to the flaring mouth of the body part, the next largest member being detachably secured to the smallest member and so on. The outer peripheral edge of the flaring mouth 12 and the similar edge of each member 11 is fluted or corrugated as at 13 so that the contents of the receptacle may pass upwardly through the body of the device. Pivotally arranged catches 14 are present for detachably securing the members together and to the flaring mouth of the body. By this arrangement it is seen that the base is comprised of nested rings and may be extended, by adding additional ring-members, if large size receptacles are employed or may be reduced, in diameter, to fit within small size receptacles. The body-part is comprised of telescopically arranged tubes the lower-most one 15 being provided with the flaring mouth 12 before referred to and being exteriorly screw-threaded to detachably receive the other tubes 16 of which the upper-most one is exteriorly screw-threaded to receive the aforesaid cap. Because of the telescopic arrangement of parts, the body may be extended vertically to fit within kettles of great height or may be compactly arranged to fit within kettles of limited height. The cap is comprised of a ring 17 having screw-threaded engagement with the upper of the tubes 16 and has super-imposed thereon an inverted dish-like top 18. The top is spaced from the ring so that liquid passing upwardly through the body may egress to the receptacle 10. Pivotally mounted upon top 18 is a detent 19 provided at each end with endwise slidable catches 20 for engaging the rim 21 of receptacle 10. The top 18 may be provided with any suitable means whereby when the detent is moved around its pivot point it may be temporarily retained to prevent displacement of the device as a whole. In the drawings I have shown a clip 22 under which the detent may be moved. Thus by extending the catches horizontally, kettles of large diameter may be used and by shifting the catches inwardly kettles of small diameter may be employed. If desired a whistle 23 may be fitted within the cap to give an audible signal when the liquid has reached a boiling point. Also if desired a coffee container may be used in conjunction with the device above described. The coffee container comprises a dished-member 24 for removably engaging over the tubes 15 and is provided with a removable cover 25. The member 24 and its cover are perforated as shown. In use the member 24 is provided with coffee and the receptacle 10 with water. As the water boils and passes up through the body and out through the cap at least a portion thereof passes through the coffee container. Of course in preparing coffee the device is not employed for other purposes at the same time.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. The combination with a cooking receptacle of an inverted funnel-like device adapted to be positioned within such receptacle, means for adjusting the base of said device to the receptacle diameter, means for adjusting the height of said device to the height of the receptacle and adjustable means for interlocking the device with respect to the rim of the receptacle.

2. The combination with a cooking receptacle of an inverted funnel-like device adapted to be positioned within such receptacle, said device having a base made up of detachable rings and having a telescopically arranged body, and adjustable means for interlocking the device with respect to the rim of the receptacle.

3. The combination with a cooking receptacle of an inverted funnel-like device adapted to be positioned within such receptacle, said device having a base made up of detachable rings having fluted peripheral edges and having a telescopically arranged body, a cap mounted upon the body and spaced therefrom and adjustable means carried by the cap for interlocking the device with respect to the rim of the receptacle.

4. The combination with a cooking receptacle of an inverted funnel-like device adapted to be positioned within such receptacle, said device having a base made up of detachable rings having fluted peripheral edges and having a telescopically arranged body, a cap mounted up and spaced from the body, a pivotal detent carried by the cap and endwise slidable catches carried by said detent for engaging the rim of the receptacle.

In testimony whereof, I have hereunto signed my name.

MATVEI G. SOTNIKOV.